(12) United States Patent
Huang

(10) Patent No.: US 6,675,027 B1
(45) Date of Patent: Jan. 6, 2004

(54) PERSONAL MOBILE COMPUTING DEVICE HAVING ANTENNA MICROPHONE FOR IMPROVED SPEECH RECOGNITION

(76) Inventor: Xuedong Huang, 20020 NE. 121st St., Woodinville, WA (US) 98072

( * ) Notice: Subject to any disclaimer, the term of this patent is extended or adjusted under 35 U.S.C. 154(b) by 0 days.

(21) Appl. No.: 09/447,192

(22) Filed: Nov. 22, 1999

(51) Int. Cl.[7] ................................................ H04Q 7/20
(52) U.S. Cl. ...................................... 455/575; 455/566
(58) Field of Search ........................ 455/90, 575, 419, 455/420, 424, 425, 19, 20, 25, 74, 76, 79, 82, 556, 557, 562, 563, 418; 379/433.03, 420.03; 381/356, 358; 343/702, 720, 895

(56) References Cited

U.S. PATENT DOCUMENTS

| | | | |
|---|---|---|---|
| 5,197,091 A | * 3/1993 | Takagi et al. | 379/433.12 |
| 5,446,789 A | * 8/1995 | Loy et al. | |
| 5,555,449 A | * 9/1996 | Kim | 379/433.03 |
| 5,828,768 A | 10/1998 | Eatwell et al. | 381/333 |
| 5,943,627 A | * 8/1999 | Kim et al. | 379/426 |
| 5,983,073 A | * 11/1999 | Ditzik | 455/11.1 |
| 6,028,556 A | * 2/2000 | Shiraki | 343/702 |
| 6,052,464 A | 4/2000 | Harris et al. | 379/433 |
| 6,052,567 A | * 4/2000 | Ito et al. | 455/90 |
| 6,125,284 A | * 9/2000 | Moore et al. | 455/557 |
| 6,137,883 A | * 10/2000 | Kaschke et al. | 379/433.07 |
| 6,243,596 B1 | * 6/2001 | Kikinis | 429/8 |
| 6,308,062 B1 | * 10/2001 | Chien et al. | 455/420 |
| 6,339,706 B1 | * 1/2002 | Tillgren et al. | 455/419 |
| 2001/0039195 A1 | * 11/2001 | Nickum | 455/557 |

FOREIGN PATENT DOCUMENTS

| | | |
|---|---|---|
| EP | 0 720 338 A2 | 7/1996 |
| EP | 0 854 535 A2 | 7/1998 |
| EP | 0 939 534 A1 | 9/1999 |
| JP | 2000196723 | 7/2000 |
| WO | WO 93/01664 | 1/1993 |
| WO | WO 95/17746 | 6/1995 |
| WO | WO 99/04500 | 1/1999 |
| WO | WO 00/45248 | 8/2000 |

* cited by examiner

*Primary Examiner*—Nay Maung
*Assistant Examiner*—Jean A Gelin (57) ABSTRACT

A mobile computing device, adapted to be held in the palm of a user's hand, includes an antenna for transmission of information from the mobile computing device. A first microphone, adapted to convert audible speech from the user into speech signals, is positioned at a distal end of the antenna. The antenna is rotatable, while the mobile computing device is held by the user, into a position which directs the first microphone toward the mouth of the user.

11 Claims, 9 Drawing Sheets

PERSONAL MOBILE COMPUTING DEVICE HAVING ANTENNA MICROPHONE FOR IMPROVED SPEECH RECOGNITION

BACKGROUND OF THE INVENTION

The present invention relates to personal mobile computing devices commonly known as handheld portable computers. More particularly, the present invention relates to a system and method for enhancing speech recognition in mobile computing devices.

Mobile devices are small electronic computing devices sometimes referred to as personal digital assistants (PDAs). Many of such mobile devices are handheld devices, or palm-size devices, which comfortably fit within the hand. One commercially available mobile device is sold under the trade name HandHeld PC (or H/PC) having software provided by Microsoft Corporation of Redmond, Wash.

Generally, the mobile device includes a processor, random access memory (RAM), and an input device such as a keyboard and a display, wherein the keyboard can be integrated with the display, such as a touch sensitive display. A communication interface is optionally provided and is commonly used to communicate with a desktop computer. A replaceable or rechargeable battery powers the mobile device. Optionally, the mobile device can receive power from an external power source that overrides or recharges the built-in battery, such as a suitable AC or DC adapter, or a powered docking cradle.

In one common application, the mobile device is used in conjunction with the desktop computer. For example, the user of the mobile device may also have access to, and use, a desktop computer at work or at home. The user typically runs the same types of applications on both the desktop computer and on the mobile device. Thus, it is quite advantageous for the mobile device to be designed to be coupled to the desktop computer to exchange information with, and share information with, the mobile device.

As the mobile computing device market continues to grow, new developments can be expected. For example, mobile devices can be integrated with cellular or digital wireless communication technology to provide a mobile computing device which also functions as a mobile telephone. Thus, cellular or digital wireless communication technology can provide the communication link between the mobile device and the desktop (or other) computer. Further, speech recognition can be used to record data or to control functions of one or both of the mobile computing device and the desktop computer, with the user speaking into a microphone on the mobile device and with signals being transmitted to the desktop computer based upon the speech detected by the microphone.

Several problems arise when attempting to perform speech recognition, at the desktop computer, of words spoken into a remote microphone such as a microphone positioned on a mobile device. First, the signal-to-noise ratio of the speech signals provided by the microphone drops as the distance between the microphone and the user's mouth increases. With a typical mobile device being held in a user's palm up to a foot from the user's mouth, the resulting signal-to-noise ratio drop may be a significant speech recognition obstacle. Also, internal noise within the mobile device lowers the signal-to-noise ratio of the speech signals due to the close proximity of the internal noise to the microphone which is typically positioned on a housing of the mobile device. Second, due to bandwidth limitations of digital and other wireless communication networks, the speech signals received at the desktop computer will be of lower quality, as compared to speech signals from a desktop microphone. Thus, with different desktop and telephony bandwidths, speech recognition results will vary when using a mobile computing device microphone instead of a desktop microphone.

SUMMARY OF THE INVENTION

A mobile computing apparatus, adapted to be held in the palm of a user's hand, includes an antenna for transmission of information from the mobile computing apparatus. A first microphone, adapted to convert audible speech from the user into speech signals, is positioned at a distal end of the antenna. The antenna is rotatable, while the mobile computing apparatus is held by the user, into a position which directs the first microphone toward the mouth of the user.

In some embodiments of the invention, the antenna is rotatable to a position that, for a particular viewing angle and separation distance of the mobile apparatus relative to the user, minimizes the distance between the first microphone and the mouth of the user. Minimizing this distance increases the signal to noise ratio of the speech signals provided by the first microphone. The mobile computing apparatus can also include a second microphone, positioned on a housing of the apparatus or elsewhere, which together with the first microphone forms at least a portion of a three dimensional microphone array. The three dimensional microphone array also increases the signal to noise ratio.

The mobile computing device can be a cellular or digital wireless telephone. The mobile computing device can also be adapted to implement speech recognition processing of the speech signals.

DETAILED DESCRIPTION OF ILLUSTRATIVE EMBODIMENTS

Figure 1:
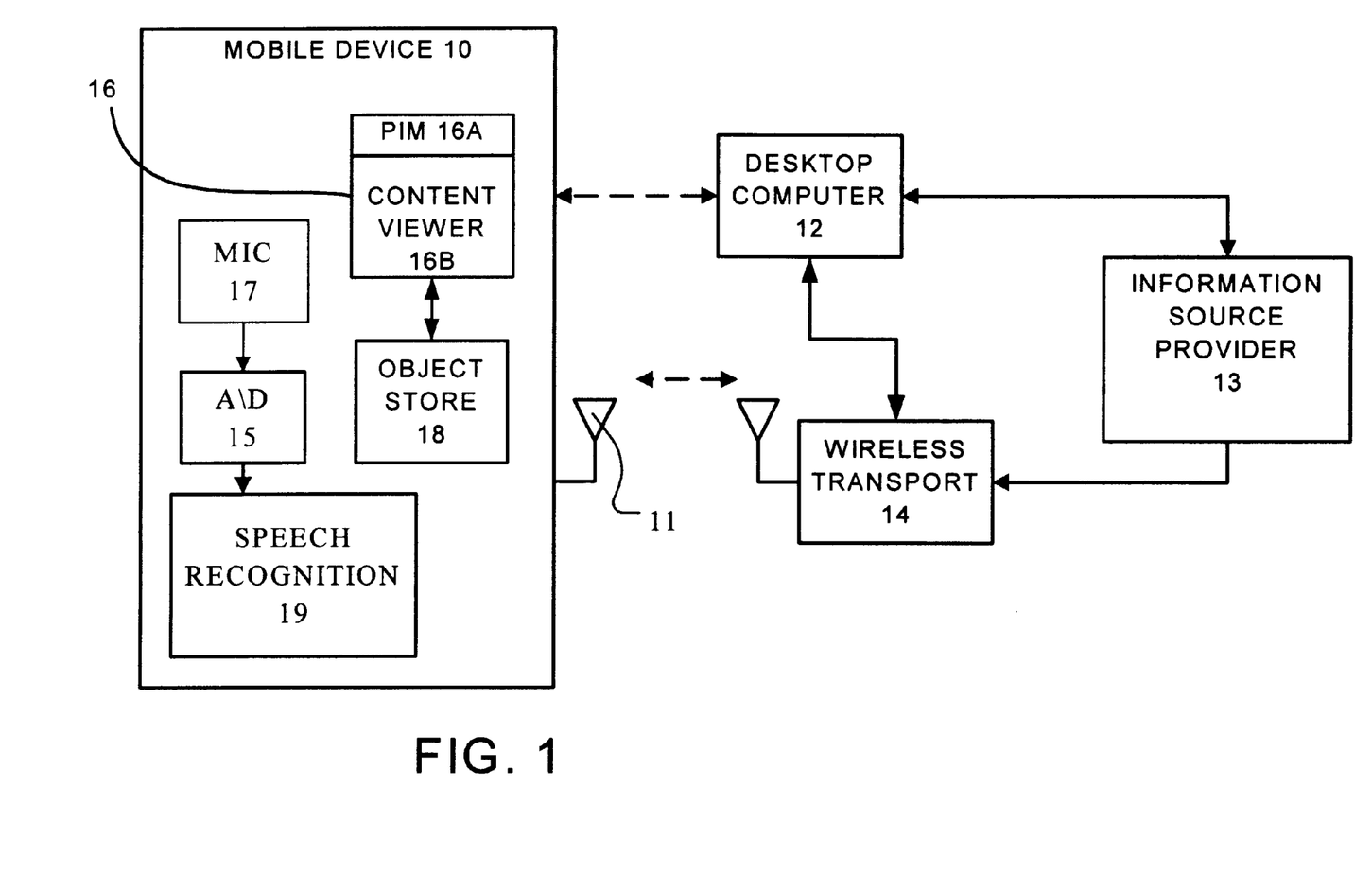
FIG. 1 is a simplified block diagram illustrating one embodiment of a mobile device in accordance with the present invention.

FIG. 1 is a block diagram of an exemplary portable computing device, herein a mobile device 10 in accordance with the present invention. FIG. 1 illustrates that, in one embodiment, the mobile device 10 is suitable for connection with, and to receive information from, a desktop computer 12, a wireless transport 14, or both. The wireless transport 14 can be a paging network, cellular digital packet data (CDPD), FM-sideband, or other suitable wireless communications. However, it should also be noted that the mobile device 10 may not be equipped to be connected to the desktop computer 12, and the present invention applies regardless of whether the mobile device 10 is provided with this capability. Mobile device 10 can be a personal digital assistant (PDA) or a hand held portable computer having cellular or digital wireless phone capabilities and adapted to perform both conventional PDA functions and to serve as a wireless telephone.

In an exemplary embodiment, mobile device 10 includes a microphone 17, an analog-to-digital (A/D) converter 15 and speech recognition programs 19. In response to verbal commands, instructions or information from a user of device 10, microphone 17 provides speech signals which are digitized by A/D converter 15. Speech recognition programs 19 perform feature extraction functions on the digitized speech signals to obtain intermediate speech recognition results. Using antenna 11, device 10 transmit the intermediate speech recognition results over wireless transport 14 to desktop computer 12 where additional speech recognition programs are used to complete the speech recognition process.

In other embodiments of the invention, intermediate speech recognition results are not transmitted to desktop computer 12, but instead programs 19 complete the speech recognition functions in mobile device 10. In yet other embodiments of the invention, mobile device 10 does not include speech recognition programs, and instead transmits the speech signals from microphone 17 over wireless transport 14 to desktop computer 12 or elsewhere. For example, in embodiments in which mobile device 10 functions as a mobile telephone, mobile device 10 can transmit the speech signals to other telephones.

In some embodiments, mobile device 10 includes one or more other application programs 16 and an object store 18. The application programs 16 can be, for example, a personal information manager (PIM) 16A that stores objects related to a user's electronic mail (e-mail) and scheduling or calendaring information. The application programs 16 can also include a content viewer 16B that is used to view information obtained from a wide-area network, such as the Internet. In one embodiment, the content viewer 16B is an "offline" viewer in that information is stored primarily before viewing, wherein the user does not interact with the source of information in real time. In other embodiments, mobile device 10 operates in a real time environment wherein the wireless transport 14 provides two-way communication. PIM 16A, content viewer 16B and object store 18 are not required in all embodiments of the invention.

In embodiments including PIM 16A, content viewer 16B and object store 18, the wireless transport 14 can also be used to send information to the mobile device 10 for storage in the object store 18 and for use by the application programs 16. The wireless transport 14 receives the information to be sent from an information source provider 13, which, for example, can be a source of news, weather, sports, traffic or local event information. Likewise, the information source provider 13 can receive e-mail and/or scheduling information from the desktop computer 12 to be transmitted to the mobile device 10 through the wireless transport 14. The information from the desktop computer 12 can be supplied to the information source provider 13 through any suitable communication link, such as a direct modem connection. In another embodiment, the desktop computer 12 and the information source provider 13 can be connected together forming a local area network (LAN) or a wide area network (WAN). Such networking environments are commonplace in offices, enterprise-wide computer network Intranets and the Internet. If desired, the desktop computer 12 can also be directly connected to the wireless transport 14.

It is also worth noting that, in one embodiment, the mobile device 10 can be coupled to the desktop computer 12 using any suitable, and commercially available, communication link and using a suitable communications protocol. For instance, in one embodiment, the mobile device 10 communicates with the desktop computer 12 with a physical cable which communicates using a serial communications protocol. Other communication mechanisms include infra-red (IR) communication and direct modem communication.

It is also worth noting that the mobile device 10, in one embodiment, can be synchronized with the desktop computer 12. In that instance, properties of objects stored in object store 18 are similar to properties of other instances of the same objects stored in an object store on the desktop computer 12 or on the mobile device 14. Thus, for example, when one instance of an object stored in the object store on the desktop computer 12, the second instance of that object in the object store 18 of the mobile device 10 is updated the next time the mobile device 10 is connected to the desktop computer 12 so that both instances of the same object contain up-to-date data. This is commonly referred to as synchronization. In order to accomplish synchronization, synchronization components run on both the mobile device 10 and the desktop computer 12. The synchronization components communicate with one another through well defined interfaces to manage communication and synchronization.

Figure 2:
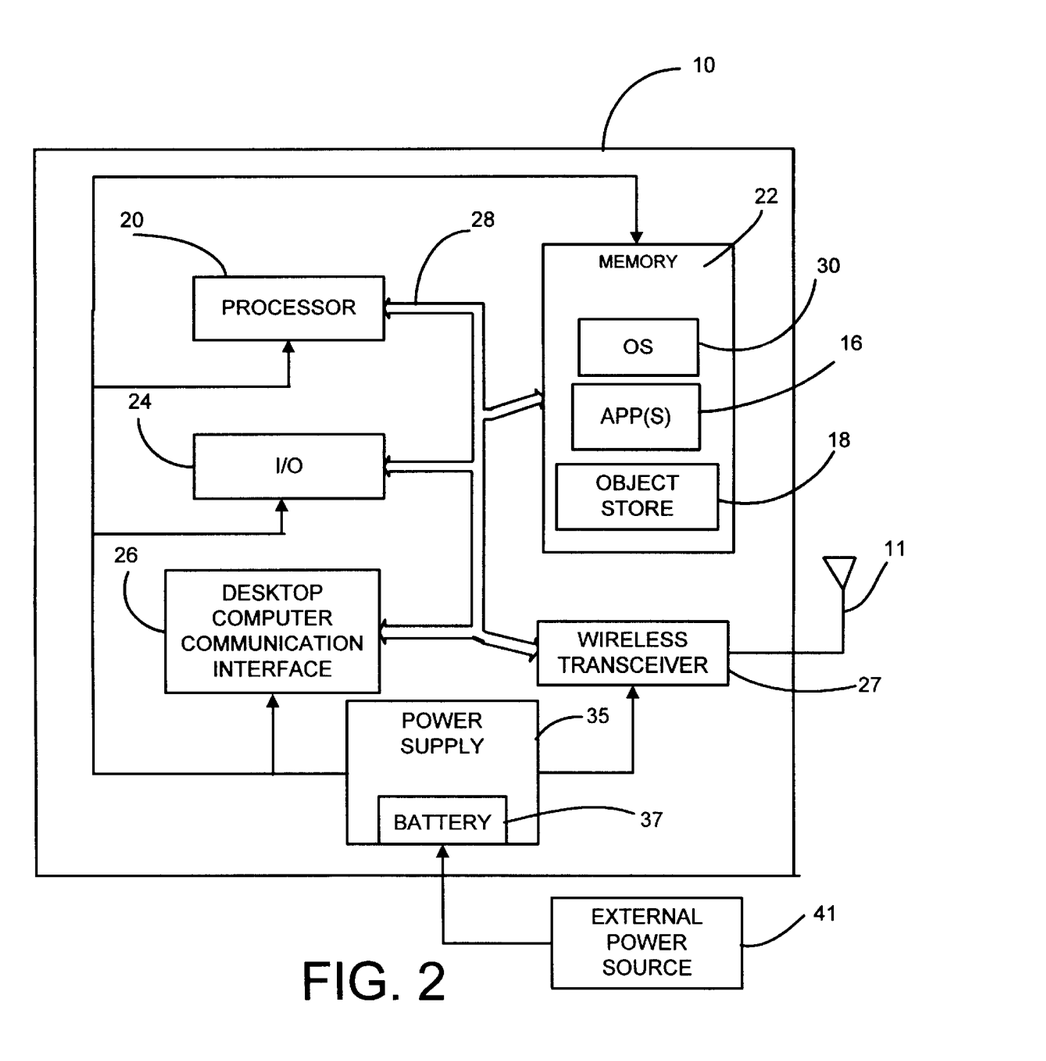
FIG. 2 is a more detailed block diagram of one embodiment of the mobile device shown in FIG. 1.

FIG. 2 is a more detailed block diagram of the mobile device 10. As shown, the mobile device 10 includes a processor 20, memory 22, input/output (I/O) components 24, a desktop computer communication interface 26, wireless transceiver 27 and antenna 11. In one embodiment, these components of the mobile device 10 are coupled for communication with one another over a suitable bus 28. Although not shown in FIG. 2, mobile device 10 includes microphone 17 as illustrated in FIG. 1 and discussed below with reference to FIGS. 3–7.

Memory 22 is implemented as non-volatile electronic memory such as random access memory (RAM) with a battery back-up module (not shown) such that information stored in memory 22 is not lost when the general power to the mobile device 10 is shut down. A portion of memory 22 is allocated as addressable memory for program execution, while the remaining portion of memory 22 can be used for storage, such as to simulate storage on a disk drive.

Memory 22 includes an operating system 30, the application programs 16 (such as PIM 16A and speech recognition programs 19 discussed with respect to FIG. 1) and the object store 18. During operation, the operating system 30 is loaded into, and executed by, the processor 20 from memory 22. The operating system 30, in one embodiment, is a Windows CE brand operating system commercially available from Microsoft Corporation. The operating system 30 can be designed for mobile devices, and implements features which can be utilized by PIM 16A, content viewer 16B and speech recognition functions 19 through a set of exposed application programming interfaces and methods. The objects in object store 18 are maintained by PIM 16A, content viewer 16B and the operating system 30, at least partially in response to calls to the exposed application programming interfaces and methods.

The I/O components 24, in one embodiment, are provided to facilitate input and output operations from the user of the mobile device 10. The desktop computer communication interface 26 is optionally provided as any suitable, and commercially available, communication interface. The interface 26 is used to communicate with the desktop computer 12 when wireless transceiver 27 is not used for that purpose.

The wireless transceiver 27 transmits speech signals or intermediate speech recognition results over wireless transport 14 using antenna 11. Wireless transceiver 27 can also transmit other data over wireless transport 14. In some embodiments, transceiver 27 receives information from desktop computer 12, the information source provider 13, or from other mobile or non-mobile devices or phones. The wireless transceiver 27 is coupled to the bus 28 for communication with the processor 20 and the object store 18 to store information received from the wireless transport 14.

A power supply 35 includes a battery 37 for powering the mobile device 10. Optionally, the mobile device 10 can receive power from an external power source 41 that overrides or recharges the built-in battery 37. For instance, the external power source 41 can include a suitable AC or DC adapter, or a power docking cradle for the mobile device 10.

Figure 3:
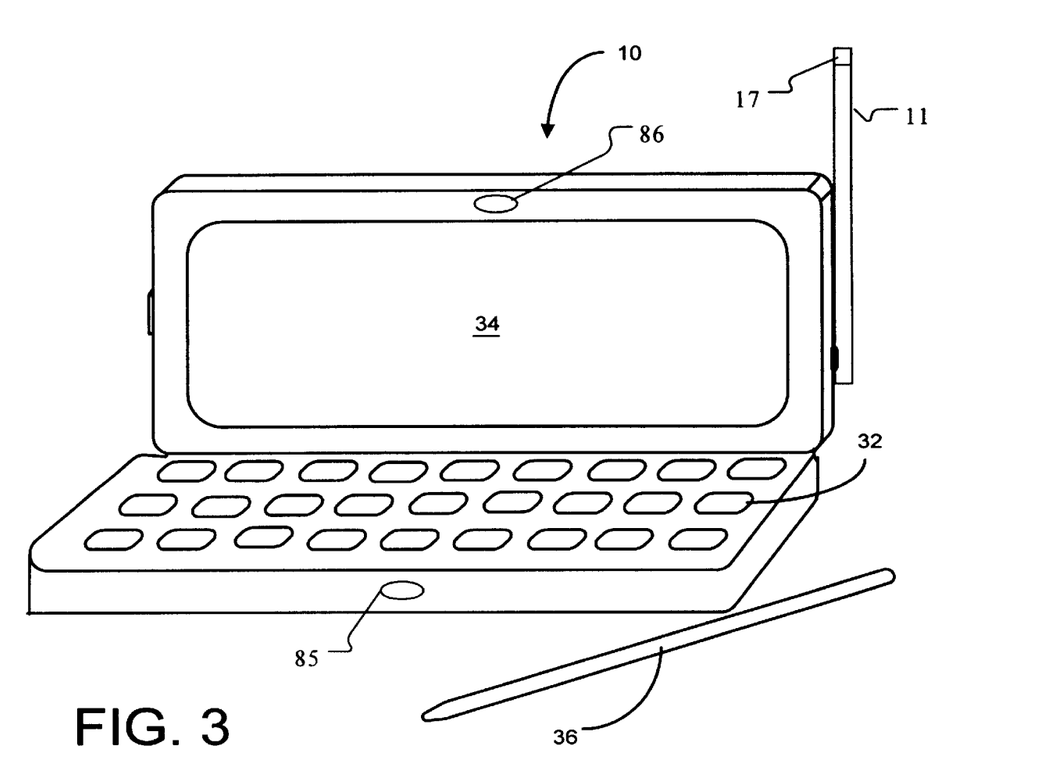
FIG. 3 is a simplified pictorial illustration of one embodiment of the mobile device in accordance with the present invention.

FIG. 3 is a simplified pictorial illustration of one embodiment of the mobile device 10 which can be used in accordance with the present invention. In this embodiment, in addition to antenna 11 and microphone 17, mobile device 10 includes a miniaturized keyboard 32, a display 34, a stylus 36, a second microphone 85 and a speaker 86. In the embodiment shown in FIG. 3, the display 34 is a liquid crystal display (LCD) which uses a contact sensitive display screen in conjunction with the stylus 36. The stylus 36 is used to press or contact the display 34 at designated coordinates to accomplish certain user input functions. The miniaturized keyboard 32 is implemented as a miniaturized alpha-numeric keyboard, with any suitable and desired function keys which are also provided for accomplishing certain user input functions.

Microphone 17 is positioned on a distal end of antenna 11. Antenna 11 is in turn adapted to rotate toward the mouth of the user, thereby reducing the distance between the mouth of the user and microphone 17 while mobile device 10 is held in the palm of the user's hand. As noted above, reducing this distance helps to increase the signal-to-noise ratio of the speech signals provided by the microphone. Further, placement of microphone 17 at the tip of antenna 11 moves the microphone from the housing of mobile device 10. This reduces the effects of internal device noise on the signal-to-noise ratio.

In some embodiments, mobile device 10 also includes second microphone 85, which can be positioned on the housing of mobile device 10. Providing a second microphone 85 which is distanced from first microphone 17 enhances performance of the resulting microphone array when the two microphones are used together. In some embodiments, speaker 86 is included to allow mobile device 10 to be used as a mobile telephone.

Figure 4:
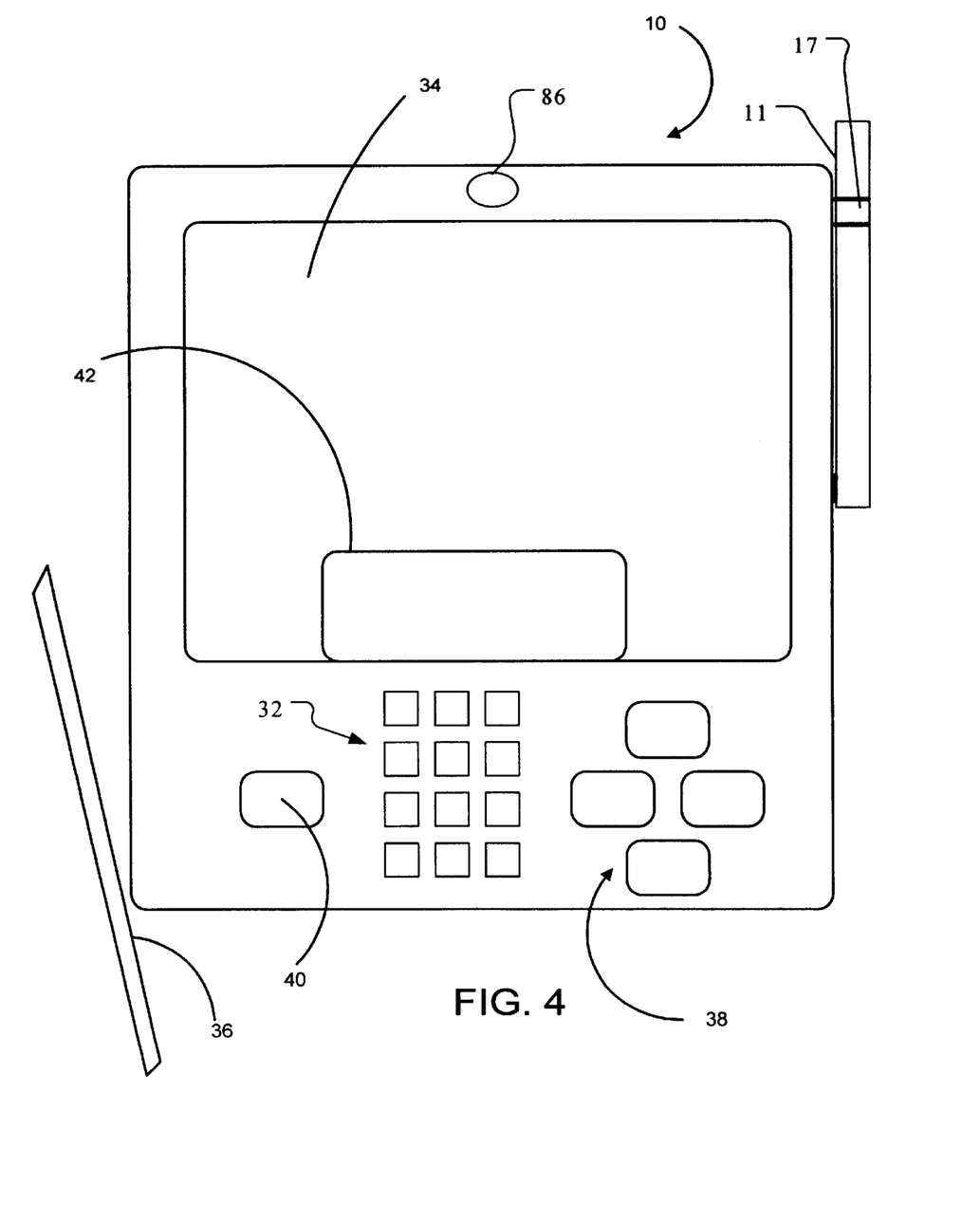
FIG. 4 is a simplified pictorial illustration of another embodiment of the mobile device in accordance with the present invention.

FIG. 4 is another simplified pictorial illustration of the mobile device 10 in accordance with another embodiment of the present invention. The mobile device 10, as illustrated in FIG. 4, includes some items which are similar to those described with respect to FIG. 3, and are similarly numbered. For instance, the mobile device 10, as shown in FIG. 4, also includes microphone 17 positioned on antenna 11 and speaker 86 positioned on the housing of the device. As shown in FIG. 4, microphone 17 need not be positioned at the distal end of antenna 11 in all embodiments. Positioning microphone 17 at other positions on antenna 11 provides many of the same benefits as does positioning the microphone at the distal end of the antenna.

Mobile device 10 also includes touch sensitive display 34 which can be used, in conjunction with the stylus 36, to accomplish certain user input functions. It should be noted that the display 34 for the mobile devices shown in FIGS. 3 and 4 can be the same size, or of different sizes, but will typically be much smaller than a conventional display used with a desktop computer. For example, the displays 34 shown in FIGS. 3 and 4 may be defined by a matrix of only 240×320 coordinates, or 160×160 coordinates, or any other suitable size.

The mobile device 10 shown in FIG. 4 also includes a number of user input keys or buttons (such as scroll buttons 38 and/or keyboard 32) which allow the user to enter data or to scroll through menu options or other display options which are displayed on display 34, without contacting the display 34. In addition, the mobile device 10 shown in FIG. 4 also includes a power button 40 which can be used to turn on and off the general power to the mobile device 10.

It should also be noted that in the embodiment illustrated in FIG. 4, the mobile device 10 includes a hand writing area 42. Hand writing area 42 can be used in conjunction with the stylus 36 such that the user can write messages which are stored in memory 22 for later use by the mobile device 10. In one embodiment, the hand written messages are simply stored in hand written form and can be recalled by the user and displayed on the display 34 such that the user can review the hand written messages entered into the mobile device 10. In another embodiment, the mobile device 10 is provided with a character recognition module such that the user can enter alpha-numeric information into the mobile device 10 by writing that alpha-numeric information on the area 42 with the stylus 36. In that instance, the character recognition module in the mobile device 10 recognizes the alphanumeric characters and converts the characters into computer recognizable alpha-numeric characters which can be used by the application programs 16 in the mobile device 10.

Figure 5:
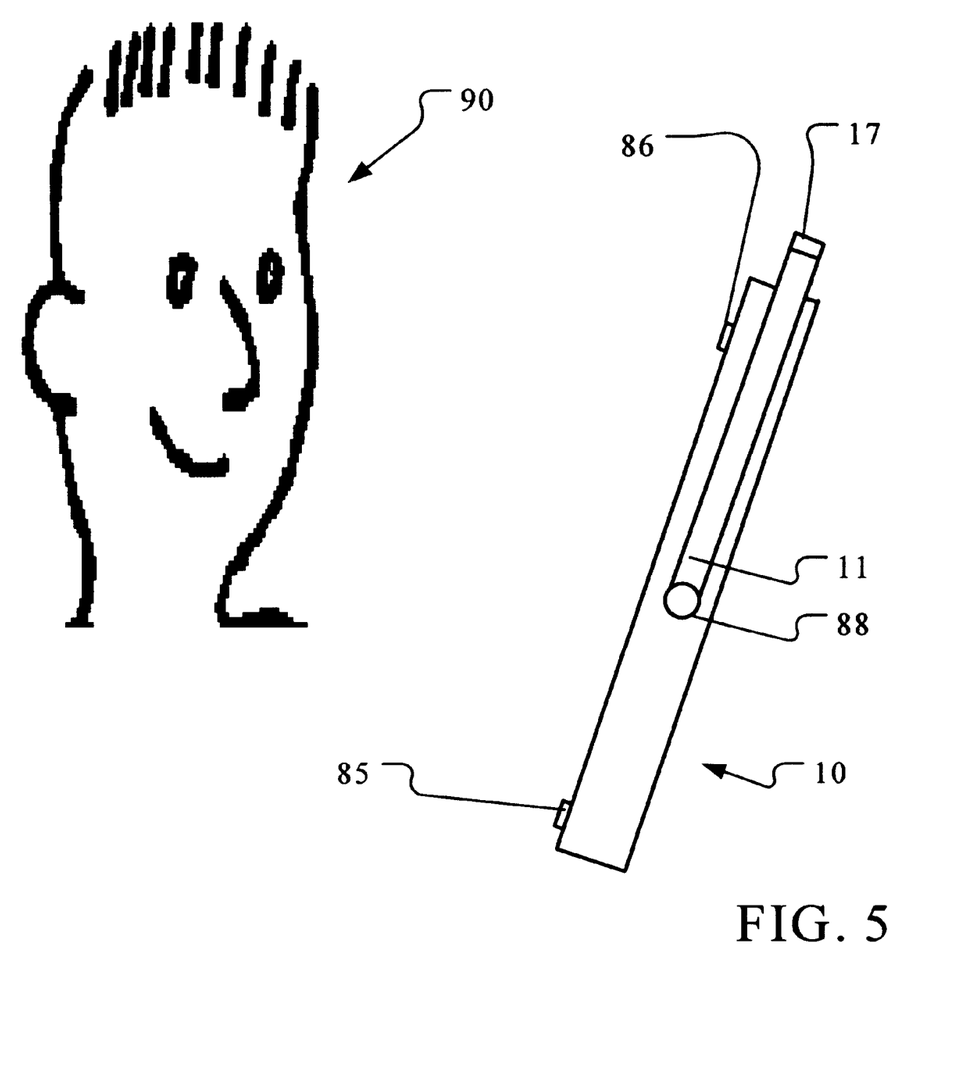
FIGS. 5 and 6 are simplified pictorial illustrations of features of some embodiments of the mobile device of the present invention.
Figure 6:
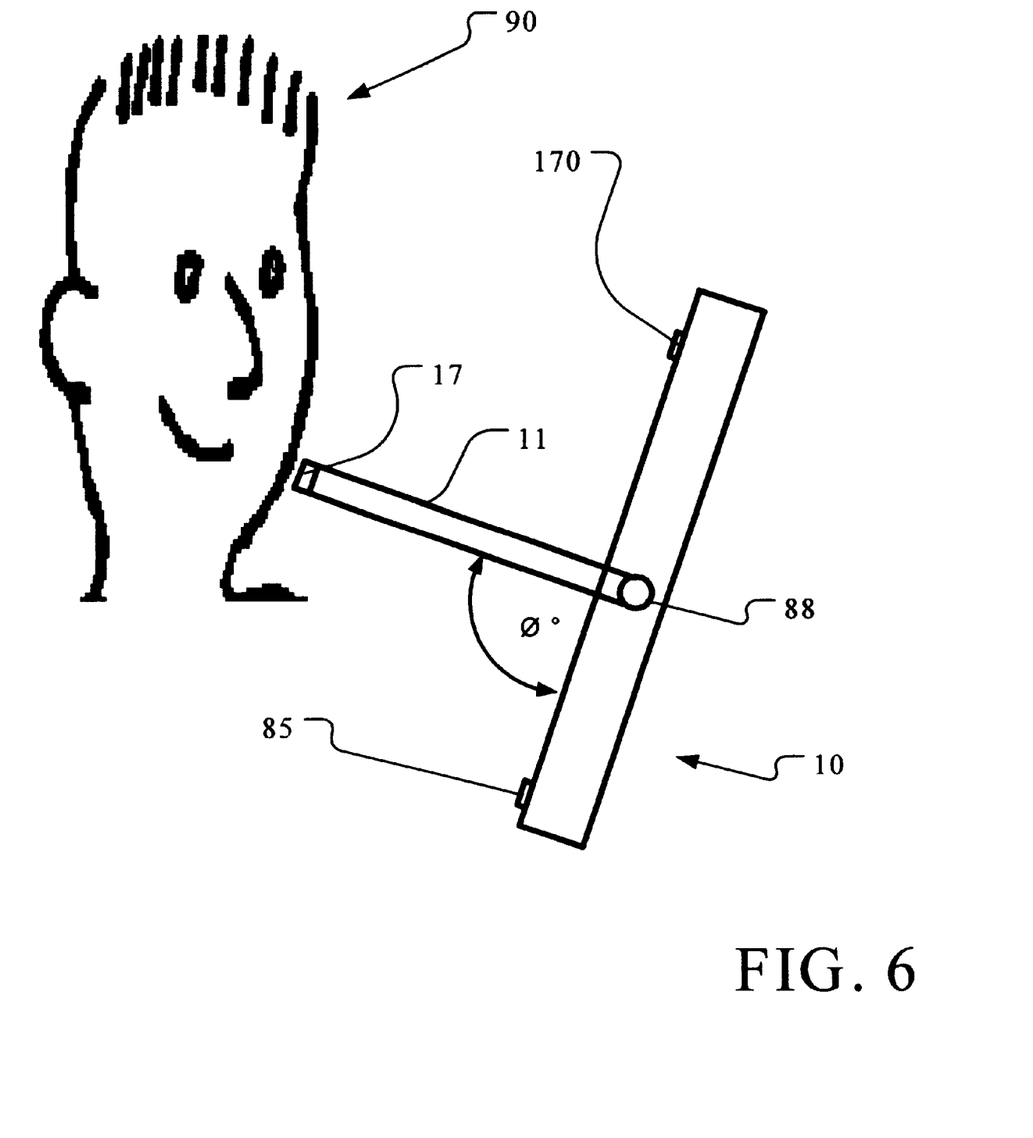

FIGS. 5 and 6 are simplified pictorial illustrations of an aspect of some embodiments of the present invention. As shown in FIGS. 5 and 6, mobile device 10 includes microphone 17 mounted on antenna 11. As illustrated, mobile device 10 also optionally includes second microphone 85 and speaker 86. With mobile device 10 held in front of user 90, antenna 11 can be rotated about pivot 88 such that microphone 17 is positioned closer to the mouth of the user. In some embodiments of the invention, antenna 11 can be rotated such that, for an optimum viewing angle and separation distance of device 10 relative to user 90, antenna 11 forms an angle ∅ relative to a surface of device 10 which results in the distance between the mouth of user 90 and microphone 17 being minimized. As discussed above, minimization of this distance, for a particular viewing angle and separation distance of mobile device 10 from the user, increases the signal-to-noise ratio of the speech signals provided by the microphone. This is beneficial in embodiments where mobile device 10 serves as a mobile telephone, and in embodiments where mobile device 10 performs speech recognition functions on the speech signals.

Figure 7:
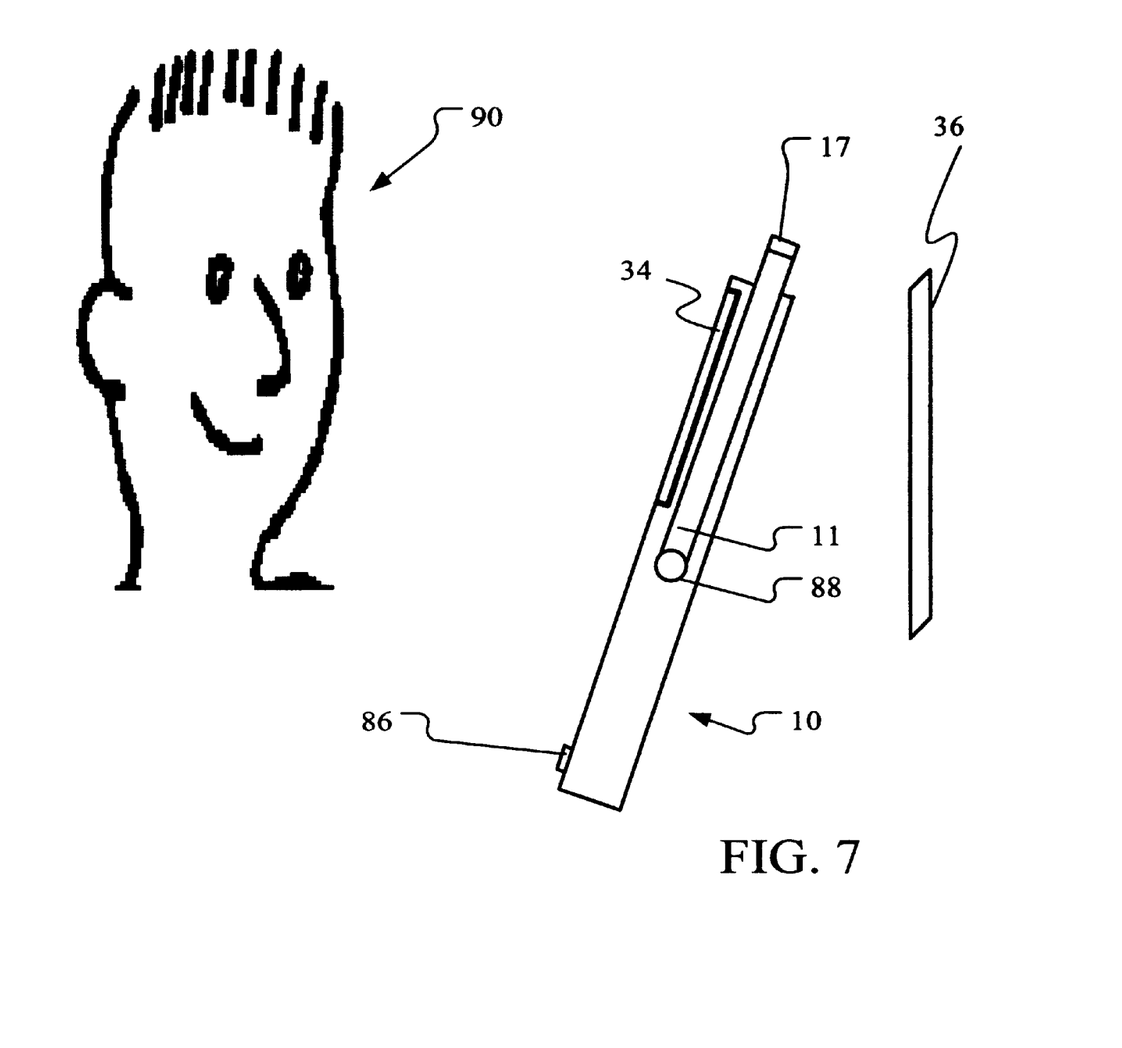
FIGS. 7 and 8 are simplified pictorial illustrations of features of other embodiments of the mobile device of the present invention in which the mobile device functions as a more conventional wireless telephone in one mode of operation.
Figure 8:
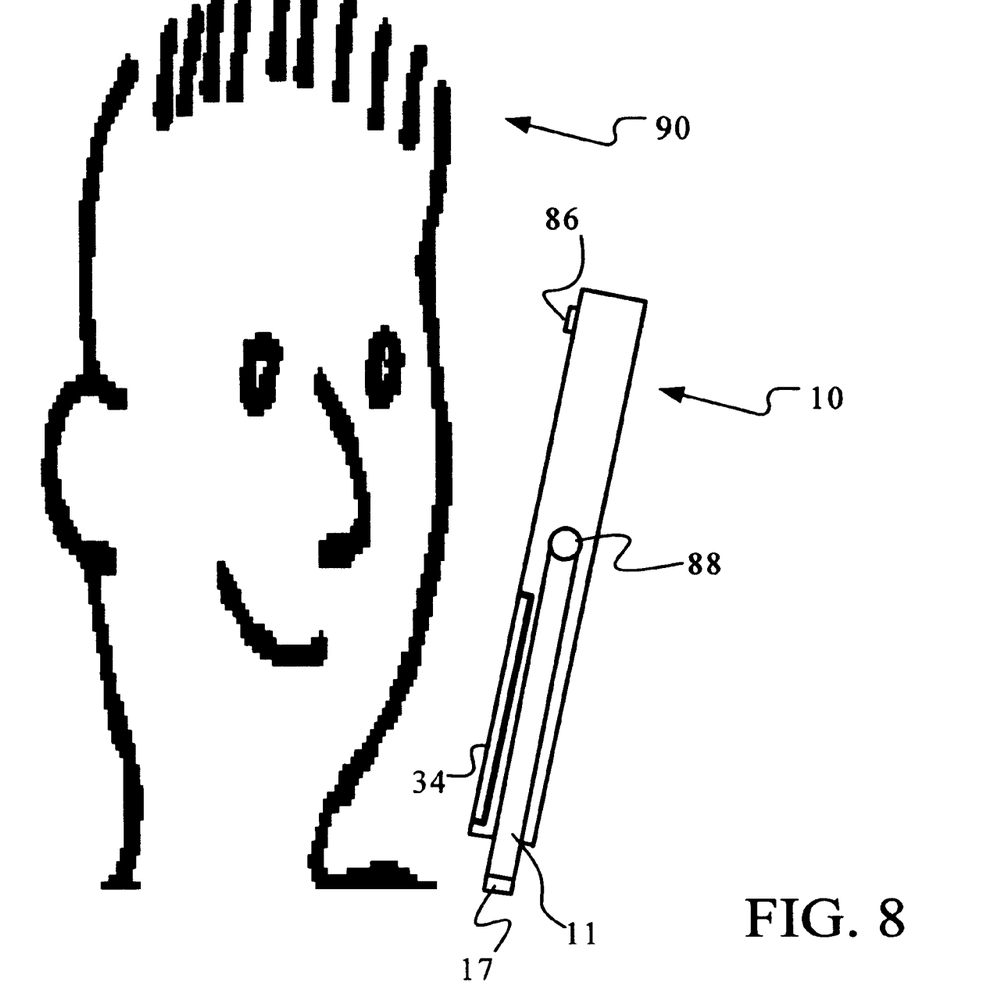

FIGS. 7 and 8 are simplified pictorial illustrations of another aspect of some embodiments of the present invention. As shown in FIGS. 7 and 8, mobile device or PDA 10 can be configured to operate as a "tap and talk" device in one mode of operation, and to operate like a conventional cordless telephone in another mode of operation. As illustrated in FIG. 7, mobile device 10 can include touch sensitive display 34 and stylus 36. Stylus 36 can be used to touch areas of display 34, for example to execute program instructions, to input data, and to dial a telephone number. Antenna 11 can be rotated, as described above, to reduce the distance between microphone 11 and the mouth of user 90 when mobile device 10 is held in the user's hand in the "tap and talk" mode of operation. In this mode of operation, user 90 can view display 34 while talking.

The embodiment of mobile device 10 illustrated in FIGS. 7 and 8 differs from the embodiment shown in FIGS. 5 and 6 in that speaker 86 is positioned at the opposite end of the device. Thus, when mobile device 10 is to be used in a more conventional cordless telephone mode of operation in which display 34 is not viewable during use, device 10 can be turned upsidedown. This mode of operation is illustrated in FIG. 8. With device 10 positioned upside down, microphone 17 can be positioned very close to the mouth of the user with little or no rotation of antenna 11. At the same time, speaker 86 can be positioned against the ear of the user. Of course, in this configuration, antenna 11 faces downward instead of upward as in conventional wireless telephones.

Figure 9:
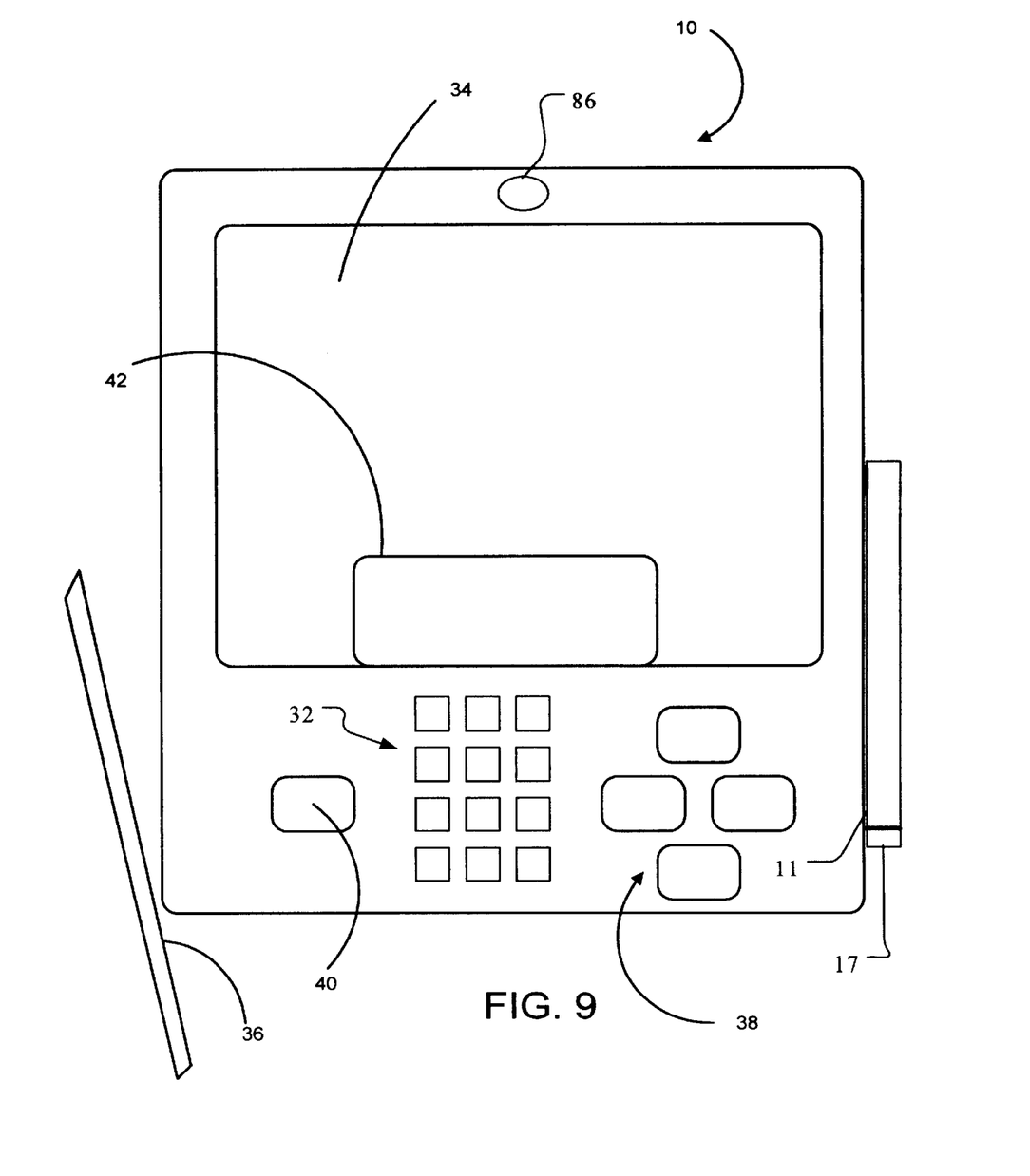
FIG. 9 is a simplified pictorial illustration of another embodiment of the mobile device in accordance with the present invention in which the mobile device can be used as a palm held personal computer and as a wireless telephone.

FIG. 9 is a simplified pictorial illustration of the mobile device 10 in accordance with another embodiment of the present invention. The mobile device 10 as illustrated in FIG. 9 is similar to the embodiment of the mobile device illustrated in FIG. 4. In addition to other common components with the mobile device illustrated in FIG. 4, in the embodiment illustrated in FIG. 9, mobile device 10 includes microphone 17 positioned on antenna 11 and speaker 86 positioned on the housing of the device. However, as shown in FIG. 9, antenna 11 and microphone 17 are positioned at the low end of the device. This reduces the distance between microphone 17 and the mouth of the user when device 10 is used as a palm held personal computer. With the antenna and microphone in this position, and with speaker 86 positioned at the top of the device, device 10 can be used as a wireless telephone by placing the device in a position with speaker 86 adjacent the ear of the user and with microphone 17 adjacent the mouth of the user.

Although the present invention has been described with reference to various embodiments, workers skilled in the art will recognize that changes may be made in form and detail without departing from the spirit and scope of the invention.

What is claimed is:

1. A mobile computing device adapted to be held in a palm of a user's hand, the mobile computing device comprising:
    a housing;
    an antenna rotatably coupled to the housing and adapted to be oriented toward the user while the mobile computing device is in the palm of the user's hand;
    a first microphone positioned on a distal end of the antenna and adapted to convert audible speech from the user into speech signals; and
    a display connected to the housing, and wherein for a particular orientation of the mobile computing device in the palm of the user's hand to achieve a particular viewing angle and separation distance of the display relative to the user, the antenna is rotatable to a position which minimizes a distance between the first microphone and the mouth of the user.

2. The mobile computing device of claim 1, and further comprising a second microphone connected to the housing and adapted to convert the audible speech from the user into speech signals, the first and second microphones forming at least portions of a three dimensional microphone array.

3. The mobile computing device of claim 1, and further comprising a wireless transceiver coupled to the first microphone and to the antenna, the wireless transceiver transmitting voice signals through the antenna in response to the speech signals provided by the first microphone.

4. The mobile computing device of claim 3, and further including:
    an analog-to-digital converter coupled to the first microphone and digitizing the speech signals; and
    a microprocessor coupled to the analog-to-digital converter and to the wireless transceiver, the microprocessor being adapted to perform speech recognition algorithms on the digitized speech signals to generate speech recognition data.

5. The mobile computing device of claim 4, wherein the voice signals transmitted through the antenna by the wireless transceiver include the speech recognition data.

6. The mobile computing device of claim 3, wherein the mobile device is a wireless telephone and further comprises a speaker adapted to convert speech signals received from another telephone into audible speech.

7. A method of performing speech recognition, the method comprising:
    providing a mobile computing device adapted to be held in a palm of a user's hand;
    rotating, an antenna of the mobile computing device toward the user such that a first microphone positioned at a distal end of the antenna is directed toward the mouth of the user, wherein the step of rotating the antenna toward the user further comprises rotating the antenna from a first position to a second position which minimizes a distance between the first microphone and the mouth of the user for a particular separation distance of the mobile device relative to the user;
    converting audible speech from the user into speech signals using the first microphone positioned at the distal end of the antenna;
    digitizing the speech signals; and
    performing speech recognition algorithms on the digitized speech signals using a microprocessor positioned within the mobile computing device to generate speech recognition data.

8. The method of claim 7, wherein the step of rotating the antenna toward the user further comprises rotating the antenna to the second position which minimizes the distance between the first microphone and the mouth of the user for a particular combination of separation distance and viewing angle of the mobile device relative to the user.

9. The method of claim 7, and further comprising:
    providing a second microphone which, together with the first microphone forms at least portions of a three dimensional microphone array; and
    converting the audible speech from the user into the speech signals using both of the first and second microphones.

10. A mobile computing device adapted to be held in a palm of a user's hand, the mobile computing device comprising:
    first microphone means for converting audible speech from the user into speech signals; and
    microphone positioning means for orienting the first microphone toward the mouth of the user; and a display means for displaying information to the user, and wherein for a particular orientation of the mobile computing device in the palm of the user's hand to achieve a particular viewing angle and separation distance of the display means relative to the user the microphone positioning means is rotatable to a position which minimizes a distance between the first microphone means and the mouth of the user.

11. The mobile computing device of claim 10, and further comprising second microphone means positioned apart from the first microphone means for forming, together with the first microphone means, a three dimensional microphone array which converts the audible speech into the speech signals.

* * * * *

UNITED STATES PATENT AND TRADEMARK OFFICE
CERTIFICATE OF CORRECTION

PATENT NO. : 6,675,027 B1
DATED : January 6, 2004
INVENTOR(S) : Xuedong Huang It is certified that error appears in the above-identified patent and that said Letters Patent is hereby corrected as shown below:

<u>Title page,</u>
Item [73], Assignee, please add -- Microsoft Corporation, Redmond, WA --.

Signed and Sealed this

Sixth Day of April, 2004

JON W. DUDAS
*Acting Director of the United States Patent and Trademark Office*